(12) United States Patent
Stewart et al.

(10) Patent No.: US 10,197,701 B2
(45) Date of Patent: Feb. 5, 2019

(54) LOGGING TOOL FOR DETERMINATION OF FORMATION DENSITY AND METHODS OF USE

(71) Applicant: QUANTUM PETROPHYSICS INC., Red Deer (CA)

(72) Inventors: Kirk Stewart, Red Deer (CA); Russel R Randall, West Richland, WA (US)

(73) Assignee: J.M. WOOD INVESTMENTS LTD., Red Deer (CA)

( * ) Notice: Subject to any disclaimer, the term of this patent is extended or adjusted under 35 U.S.C. 154(b) by 656 days.

(21) Appl. No.: 13/852,862

(22) Filed: Mar. 28, 2013

(65) Prior Publication Data

US 2013/0261974 A1    Oct. 3, 2013

Related U.S. Application Data

(60) Provisional application No. 61/619,689, filed on Apr. 3, 2012.

(51) Int. Cl.
  *G01V 5/12* (2006.01)
  *G01V 5/04* (2006.01)
(52) U.S. Cl.
  CPC .............. *G01V 5/125* (2013.01); *G01V 5/045* (2013.01)
(58) Field of Classification Search
  CPC .................................... G01V 5/125
  USPC ............................................. 702/8
  See application file for complete search history.

(56) References Cited

U.S. PATENT DOCUMENTS

| 3,321,625 | A |   | 5/1967  | Wahl         |             |
|-----------|---|---|---------|--------------|-------------|
| 4,129,777 | A |   | 12/1978 | Wahl et al.  |             |
| 4,459,479 | A | * | 7/1984  | Smith, Jr. ..... | G01V 5/06   |
|           |   |   |         |              | 250/256     |
| 4,578,580 | A | * | 3/1986  | Smith, Jr. ..... | G01V 5/125  |
|           |   |   |         |              | 250/269.3   |
| 4,661,700 | A | * | 4/1987  | Holenka ...... | G01V 5/125  |
|           |   |   |         |              | 250/256     |
| 4,668,863 | A | * | 5/1987  | Gray ............ | G01V 5/102  |
|           |   |   |         |              | 250/256     |
| 4,958,073 | A |   | 9/1990  | Becker et al. |            |

(Continued)

OTHER PUBLICATIONS

GE Energy Oilfield Technology, "Swift, Accurate Measurement", 2009.*

(Continued)

*Primary Examiner* — Alexander Satanovsky
*Assistant Examiner* — Lina M Cordero
(74) *Attorney, Agent, or Firm* — Parlee McLaws LLP (CGY); Sean Goodwin; Linda Thompson

(57) ABSTRACT

Apparatus for wellbore logging and method of use are provided for measurement of the annular materials interposed between the logging tool and formation and the apparent formation bulk density in open-hole, cased-hole or other conduit. The logging tool can be centralized in the borehole. Non-collimated gamma radiation is emitted into the surrounding media and the amount of radiation which returns to the tool is measured by multiple omni-directional detectors spaced a pre-set distances from the source to provide multiple radial depths of investigation. The annular thickness and density of materials interposed between the logging tool and the formation may be determined from the detector responses and be used to derive the apparent formation bulk density.

5 Claims, 8 Drawing Sheets

(56) References Cited

U.S. PATENT DOCUMENTS

| | | | | |
|---|---|---|---|---|
| 5,198,770 A * | 3/1993 | Decorps | ............... | G01V 11/002 181/102 |
| 5,390,115 A | 2/1995 | Case et al. | | |
| 5,525,797 A | 6/1996 | Moake | | |
| 5,528,495 A * | 6/1996 | Roscoe | ..................... | G01T 1/24 702/11 |
| 5,608,215 A * | 3/1997 | Evans | ................... | G01V 5/101 250/254 |
| 5,627,368 A * | 5/1997 | Moake | ..................... | G01V 5/12 250/266 |
| 5,804,820 A * | 9/1998 | Evans | ................... | G01V 5/101 250/269.2 |
| 5,912,460 A * | 6/1999 | Stoller | .................. | G01V 5/125 250/269.3 |
| 6,909,969 B2 | 6/2005 | Calvert et al. | | |
| 7,117,092 B2 * | 10/2006 | Jacobson | ............... | G01V 5/101 702/8 |
| 7,292,942 B2 | 11/2007 | Ellis et al. | | |
| 7,328,106 B2 | 2/2008 | Calvert et al. | | |
| 7,482,578 B2 | 1/2009 | Randall | | |
| 8,583,377 B2 * | 11/2013 | Moake | ................ | E21B 47/1015 702/8 |
| 2008/0061225 A1 * | 3/2008 | Orban | .................... | G01V 5/125 250/269.3 |
| 2009/0039242 A1 * | 2/2009 | Botto | .................... | G01V 5/125 250/269.3 |
| 2010/0017134 A1 * | 1/2010 | Steinman | ................ | E21B 43/04 702/8 |
| 2010/0252725 A1 * | 10/2010 | Stewart | ................. | G01V 5/125 250/269.3 |
| 2011/0253364 A1 * | 10/2011 | Mosse | ................... | G01V 5/125 166/254.2 |
| 2011/0285398 A1 * | 11/2011 | Villegas | ................ | G01V 5/104 324/326 |

OTHER PUBLICATIONS

"Multi-Echo Acoustic Televiewer"; USGS Groundwater Information: Branch of Geophysics; www.usgs.gov/ogw/bgas/multi-echo_atv/.

"Cargo Screening: Selection of Modality"; Paul Bjorkholm; Port Technology International; pp. 37-39.

* cited by examiner

LOGGING TOOL FOR DETERMINATION OF FORMATION DENSITY AND METHODS OF USE

FIELD

Embodiments of the invention are related to the field of wellbore logging tools and instrumentation, and more particularly to the measurement of the apparent formation bulk density of subsurface earth formations formation in either an open-hole or a cased boreholes using an uncollimated gamma ray source and one or more uncollimated gamma ray detectors for determining the density of the subsurface formation and the density and thickness of materials transposed between the logging tool and the subsurface formation while not directly contacting the borehole.

BACKGROUND

Well logging instruments have been used to measure earth formations along the traverse of a borehole for over 80 years. Most of the instruments designed for measuring the apparent formation bulk density of an earth formation have been derived from an instrument disclosed in U.S. Pat. No. 3,321,625 issued to Wahl in which a compensated gamma-gamma measurement is derived from measuring the mud-cake along the borehole wall using an eccentralized, collimated tool string. Well logging instruments are typically lowered into a well on electro-mechanical cable, solid wireline cable (slickline), conductor slickline, coiled tubing, drill pipe, tubing, continuous rod (COROD™) well tractor or via pump-down methods. The signals from the tool may be transmitted to surface through electro-mechanical cables with conductors (Surface Read Out or SRO), stored to a downhole tool memory (Memory Logging) or transmitted to surface via Mud-Pulse Telemetry or Electromagnetic Pulse Telemetry methods, such as those used in MWD (Measurement While Drilling) and LWD (Logging While Drilling) methods. The instruments lowered into the wellbore include sensors for measuring various properties of the earth formations.

Measurement of the apparent bulk density of an earth formation is particularly useful and has applications in determining the fractional volume of pore space in the earth formation that may contain oil or gas, determine the overburden force of an earth formation at any particular depth and to determine the mineral composition of an earth formation amongst other things.

Well logging instruments used for the determination of the apparent formation bulk density are well known in the prior art. Such instruments generally consist of a pad to contact the borehole wall and that is made of a high Z material to be impervious to radiation. The pad houses a steady-state isotopic chemical source, such as cesium-137, and a plurality of gamma-ray scintillation detectors that are spaced apart from the $^{137}$Cs source. The $^{137}$Cs source and the gamma-ray scintillation detectors are collimated toward the borehole wall and the tool is run decentralized so that the collimated windows are, preferably, in constant contact with the borehole wall. It is known to those skilled in the art that the collimated windows are made of a material that is transparent to gamma-ray radiation.

The use of two or more gamma-ray detectors spaced apart at different distances from the gamma-ray source is known to those skilled in the art as a method used to produce a formation bulk density log that is compensated for mud-cake effects, such effects being the mud-cake density and the mud-cake thickness. The Short-Space (SS) gamma-ray detector is primarily sensitive to gamma-rays that have been scattered in the mud-cake, while the Long-Space gamma-ray detector (LS) detector is primarily sensitive to gamma-rays that have been scattered in the formation. The outputs of the SS and LS gamma-ray detectors may then be used to generate a log of apparent formation bulk density that is corrected for mud-cake density and mud-cake thickness through the use of a "Spine and Ribs" correction, known to those skilled in the art. Essentially, if a volume of low-density mud is between the pad and the formation to be measured, and if the mud density is less than the formation density, then a positive density correction is applied to the LS density reading to correct for this condition. Alternatively, if the mud density is greater than the formation density, then a negative density correction is applied to the LS density reading to correct for this condition. This correction is only valid if the tool standoff is minimal and the density pad is in direct contact with the formation. It has been disclosed in prior art that for thin mudcakes up to 0.5 in., the spine and ribs correction for mudcake thickness is insensitive to the mudcake density. When the mudcake exceeds 0.5 in., the mudcake density introduces significant errors into the corrections.

This problem in the prior art detectors is attributed to data taken from two detectors which does not provide any means of taking into account differences in mudcake density in correcting the apparent density from the far detector count-rate. If the borehole wall is rugose and gaps appear between the density tool pad and the borehole wall, the apparent formation bulk density may not be determined due to the excess mud volume, the mud density and the mud thickness between the pad and the earth formation, a condition often referred to as excessive standoff. In a cased-hole application, a built-in standoff is created by the casing wall and the cement thickness, mitigating the pad from directly contacting the formation.

The use of a high Z material to shield the gamma-ray source and the gamma-ray photon detectors serves to collimate the gamma radiation into a beam and shield the gamma-ray detectors from incident gamma-ray radiation that is outside of the scattering or collimation region. The collimated gamma-ray emissions from the gamma-ray source enter a region of the earth formation where the gamma-rays can interact or collide with the electrons orbiting the atoms in the materials comprising the earth formation. Each collision can cause a gamma-ray to lose some of its energy and be deflected from its original path or direction of travel and is known to those familiar with the art as Compton Scattering. Photoelectric Absorption occurs when the gamma ray energy is so low that the gamma-rays are absorbed by electrons. A $^{137}$Cs source is typically preferred as the gamma-ray energy of $^{137}$Cs (662 keV) falls within the region of Compton Scattering events and with a half-life of 30.23 years, offers a stable source of gamma-ray emissions. Collimation of the gamma-ray source and the gamma-ray detectors only allows for the detection of backscattered gamma-ray radiation through a certain range of angles, thus only a certain volume can be detected, essentially providing a one-dimensional response.

Conventional pad-type formation bulk density tools have been run in steel-cased wellbores in attempts to derive a formation bulk density and locate gas, oil and water horizons. The success of these tools has been very limited in providing a quantitative measure of the apparent formation bulk density of an earth formation primarily as a function of the tool count-rates being severely affected by the collimation of the gamma-ray source and scintillation detector(s), the steel casing, the cement or annular density of the fill material behind the casing and the unknown thickness of the cement or annular fill material behind the casing.

Further, the collimation of the tools precludes any form of spectral de-convolution being used to resolve the apparent formation bulk density using Compton ratio methods. Still further to this, the tool collimation results in a one-dimensional measurement that effectively eliminates a large fraction of the wellbore region from being measured. Collimation also has a further effect of reducing the depth of investigation of the tools resulting in shallow measurements that typically cannot extend beyond the near wellbore region of interest in order to correct for the environmental effects of the annular fill region. Subsequently, a compensated apparent formation bulk density measurement may not be achieved under the vast majority of wellbore conditions as a direct result of the shallow depth of investigation of collimated instruments and an inability to quantify and correct for these effects. Additionally, casing eccentricity in the borehole creates a non-uniform annulus that may have varying degrees of annular-fill thickness surrounding the periphery of the casing at any given point. These additional stimuli all affect the true formation bulk density response and require to be resolved in order to correct the measured tool responses for these perturbations to produce a correction compensation factor that accounts for all of the aforesaid unknowns. Prior art has still relied upon a conventional "Spine and Ribs" approach correction that has limited application to the problem and may only be applicable under ideal conditions wherein the combined casing thickness and cement thickness fall below a known value, typically 1.5 inches. Of the numerous factors related to "correcting" the apparent formation bulk density measurement in a through-casing environment, the casing has been treated as a constant factor based on the rate of gamma-ray attenuation through various thicknesses of steel casing and is not measured directly, thus, variations in casing thickness are not measured or corrected for.

In U.S. Pat. No. 4,129,777 issued to Wahl et al, a method is disclosed of measuring cement thickness using a collimated density tool and using the thickness value as an index on the reliability of the formation density measurement. As disclosed by Wahl et al, as long as the cement thickness does not exceed one inch, the density reading from the far-space count-rate can be considered as reflecting the true porosity of the formation. In the same patent, Wahl et al, also discloses that if the cement thickness exceeds one inch, then the far space count-rate measure of formation porosity has not been accurately compensated for the effect of the cement layer. It is easy to see that this method relies upon the optimal condition of having a thin, uniform cement annulus and no pipe eccentralization is prevalent. Conditions such as this are seldom seen in reality.

In U.S. Pat. No. 5,525,797 issued to Moake, a three detector, multi-collimated tool is described that is reportedly effective in either cased-hole or open-hole although no tool was ever built to confirm the claims. In the Moake patent, the gamma-ray source is collimated and each of the three detectors retains a different angle of collimation to provide multiple depths of investigation to measure the annular effects behind casing. The Moake tool, unlike conventional art density tools, is not a pad-type device but does require to be decentralized against the borehole or casing wall. The Moake patent also refers to the use of multiple detector spacing ratios to match the anticipated cement thickness expected in the well. Essentially this requires that the source-to-detector spacing of each scintillation detector requires to be adjusted to increase or decrease the depth of investigation based upon the reported well conditions which are unknown and may only be inferred from assuming ideal conditions. Such a tool configuration demands that either multiple tools be made available with various source-to-detector spacing's or either an adjustable detector chassis complete with numerous collimated pressure housings to match the scintillation detector windows be made available as a matter of utility. Either method precludes any real practicality of the device. Further to this, like the prior art patents previously mentioned, collimation creates a one-dimensional measurement that eliminates a large fraction of the well bore region from being measured, thus the tool azimuthal bearing in the well will render different responses in the same well from run to run as the tool rotates.

In U.S. Pat. No. 5,390,115 issued to Case et al, another collimated tool, uses a collimated gamma-ray source and three collimated detectors. Case professes to have a method in which to estimate the mudcake thickness independent of the mudcake density. The Case patent was focused solely on open-hole logging and it wasn't until 12 years later that U.S. Pat. No. 7,292,942 B2 to Ellis et al was published that employs the same tool technology but with a claim to measure formation density through casing. The Ellis patent essentially exploits the technology of the Case patent with the claim that the Ellis patent is only capable of determining the apparent formation bulk density through-casing when the maximum combined thickness of the casing and cement is less than 1.75 inches or 1.85 inches. Should these conditions be exceeded, then the well log data is flagged as having too great a stand-off to be accurately measured.

As with the previous prior art patents, the Ellis patent is based on a collimated gamma-ray source and collimated scintillation gamma-ray detectors with a limited depth of investigation, a narrow one-dimensional borehole volume and self-described limitations in a cased-hole.

The primary reason for the inability to correct for these factors using current state-of-the-art collimated technology is due to the scattering geometry principles in use being directly affected by these conditions and through an increased tool stand-off whereby the density pad is not in direct contact with the formation wall. These effects all contribute to variations in the LS and SS count-rates to the point that a conventional "Spine and Ribs" approach correction may not be applied to the individual count-rates as the effects of the near wellbore region may not be properly compensated for or adequately measured. This includes the casing thickness, the cement or annular mud thickness, the cement or annular mud density and the tool stand-off itself as a result of borehole rugosity. Patents relating to the use of an eccentered, collimated pad-type density tool run in steel casing have also been granted to Reeves Wireline Technologies. (Ref. Patent U.S. Pat. No. 6,909,969, Jun. 21, 2005 and Ref. Patent U.S. Pat. No. 7,328,106, Feb. 5, 2008). The Reeves '969 Patent claims a 'Method of Through-Casing Gas Detection', while the Reeves '106 Patent claims a 'Method of Correcting Density Logs for the Presence of Casing'. In both the '106 Patent and the '969 Patent, Calvert et al claims to treat the casing as a high-density mudcake in order to apply a conventional "Spine and Ribs", Short-spaced density versus long-spaced density correction, however, the method is incapable of correcting for the irregular cement-filled annulus encircling the steel casing. Furthermore, the dimensions of the annulus are such that they affect the accuracy of the "Spine and Ribs" method, therefore precluding the use of this technique as a means to quantify bulk density through-casing. This method has been documented by Elkington et al (Weatherford, 2006) to be ineffective when the combined casing wall and cement thickness approach a thickness of 1.35 inches and further claims that all sensitivity to formation density is lost when the stand-off exceeds 1.5 inches.

The presence of casing is but one factor that must be overcome to properly measure the annular space between the steel casing and the earth formation in order to derive an apparent formation bulk density.

With the current state-of-the-art collimated pad type devices, the pad must be pressed directly into the borehole wall to provide direct contact of the pad through the mudcake to measure the apparent formation bulk density. Similarly, a collimated, "slick" (non-pad) borehole sonde may run in casing or open-hole to provide a qualitative measure of bulk density by decentralizing the sonde against the casing wall or open-hole. Such "slick" (non-pad) collimated devices have inherited the same deficiencies as the pad-type devices as a direct result of using the same tool geometry. Furthermore, for a collimated pad-type skid to be effective in a cased-hole and in order to preclude any wellbore fluid becoming interposed between the density pad and the casing, the pad radius must be designed to tightly follow the internal casing diameter radius to mitigate any fluid being "trapped" between the pad and the casing wall which would have the effect of introducing more error into the density measurement. This would require multiple pad curvatures to match the numerous casing dimensions used in the industry in order to remove this effect.

Contained within the density pad is a source of gamma-ray radiation oriented to the borehole wall through a collimator and two gamma-ray detectors that are also collimated to the borehole wall. Similarly, in the non-contact "slick" (non-pad) sonde, the source of gamma-ray radiation and the gamma-ray detectors are also collimated. This tool geometry is described as "single-scatter" geometry.

In both collimated tool configurations, in an open-hole environment, the collimation of the gamma-ray source and the gamma-ray detectors works to reduce the radiation source intensity bombarding the formation; reduce the depth of investigation; reduce the gamma-ray detector count-rate intensity; reduce the earth formation sampling volume as only those gamma-rays scattered through a certain range of angles will be detected; reduce the borehole sampling region; reduce the count-rate (detector) statistics; reduce the count-rate (detector) sensitivity; increase the radiation hazard to personnel; create poor repeatability; create a small, focused measurement volume; respond to both Compton scattered and photoelectric absorption gamma-rays; limit the amount of mud cake thickness correction that may be applied as a result of a reduced depth of investigation due to collimation (typically ¾"); render a spine and ribs correction method to correct for mud cake thickness ineffective for mud cake thickness greater than ¾"; produce an invalid measure of the formation bulk density when mud cake thickness exceeds ¾" or in regions of rugose hole conditions and, which is further influenced in a cased-hole by; a further reduction in count-rates as a direct result of gamma-ray attenuation through steel casing; a further reduction in count-rates as a direct result of gamma-ray attenuation through cement as a function of the cement density; a further reduction in count-rates as a direct result of gamma-ray attenuation through cement as a function of the cement thickness; an inability to correct for the cement-filled annulus as a result of the cement density and cement thickness (i.e. "spine and ribs" industry correction); an inability to account for or correct for hole geometry (casing eccentricity, hole ovality, hole rugosity, etc); an inability to measure the cement density as a result of too few gamma-ray detectors; an inability to measure the cement thickness as a result of too few gamma-ray detectors; an inability to measure the casing thickness as a result of too few gamma-ray detectors; an inability to compensate for penetration by increasing the source-to-detector spacing as a result of further decreasing the count-rates reaching the detectors; a further reduction in depth of investigation as a direct result of above cased-hole conditions; an inability to measure any photoelectric absorption gamma-rays; an inability to derive a delta rho correction, therefore; an inability to derive a compensated formation bulk density value.

Additionally, the application of gamma-ray spectroscopy would be ineffective in a collimated system as a direct result of too few count-rates leading to a lack of sensitivity for each variable to be analyzed.

In a US Patent Application, US 2010/0252725 A1, to Stewart, published Oct. 7, 2010 and now abandoned, a method was described for determining the bulk density of an earth formation using an omni-directional radiation source and a pair of non-shielded or non-collimated radiation detectors. This configuration was run centralized in a wellbore as opposed to eccentered and offered a new approach to measure the bulk density of an earth formation through steel casing or in an open-hole.

As set forth in the Stewart application, a method for obtaining information indicative of the bulk density of a subterranean earth formation penetrated by a wellbore was provided comprising irradiating the formation with a non-collimated emission of gamma ray radiation produced by a gamma ray source; and establishing measurements, such as count-rates, of non-collimated scattered gamma rays produced by the formation in response to such irradiation and detected by a pair of gamma ray detectors. A non-collimated gamma ray source was operative to irradiate a subterranean formation with a non-collimated emission of gamma ray radiation; and a pair of non-collimated gamma ray detectors spaced axially from the source, each operative to detect and measure a count-rate of non-collimated scattered gamma rays produced by the formation in response to such irradiation. Optionally, the tool is centralized in the wellbore in the course of logging.

In Stewart and in for purposes of this specification, the following terms have the following meanings: "substantially non-shielded" means that each of the source and detectors are shielded only to the extent needed to effectively prevent radiation moving up or down axially along the tool to deleteriously affect the working of the detectors, but are otherwise generally non-shielded on the sides so as to respectively emit or collect gamma rays in a non-collimated manner, substantially omni-directional and "generally spherical" in effect.

Regardless of Stewart's move to a non-collimated source, and the Stewart system was capable of reproducing an approximate formation bulk density measurement in most situations, it was found that dynamic human intervention was required to "fine-tune" the responses. The linear transforms methodologies were vulnerable to variations in any one of the variables of density and thickness. Accordingly, it appears as through the Stewart system, as disclosed, is no able to derive a borehole compensated bulk density if run in a "blind" test. Overall, Applicant believes it would be impossible for the Stewart tool described in US 2010/0252725, in its current configuration, using gross gamma-ray count-rates, to derive all of the necessary measurements to correct for borehole conditions to acquire an apparent bulk density measurement.

Further, as with the Reeves 106 B2 and 969 B2 Patents, irregular annulus dimensions would most likely preclude the use of an industry standard "Spine and Ribs" correction. Neither Reeves patent is able to provide a measure of: an apparent formation bulk density of an earth formation; an apparent cement or annular density measurement; an apparent cement or annular thickness measurement; a casing thickness measurement; a measure of the tool stand-off to the formation; or a measure of the borehole fluid density.

Given the realities of well logging, Applicant believes this would be an impossible situation to predict or overcome in a real-life application due to a number of factors, some of which are identified as borehole dimensions vary due to lithology changes, mud type, tectonic stresses. Casing is seldom centered in the borehole as this would require the use of multiple centralizers to be ran over the depth of the entire well. Wells are often drilled at some angle from vertical, albeit minor, introducing more casing eccentricity Poor mud removal during primary cementing may alter the cement thickness across any given depth interval. Poor mud removal during primary cementing may preclude any cement being placed across a given interval. Cement hydration during curing may shrink the cement sheath away from the casing or formation or both. Cement may become invaded with gas and or water as it cures, effectively reducing the cement density and cement volume behind the casing. A delta RHO or density correction, might not be derived as a result of variations in annular thickness and the limitations of the tool depth of investigation relative to the detector spacing's used. An apparent formation bulk density could not be derived as a result of the failure of the correction and further, if the detectors were collimated, the collimation angles would also need to be varied for each detector in order to alter the depth of investigation required as a result of varying thicknesses.

Clearly there is still a need for well logging apparatus which overcomes the problems associated with the prior art devices.

SUMMARY

In order to make a formation density measurement in a borehole, the following measurement parameters are relevant: the formation density itself; and in cased wells, cement thickness and density; cement geometry cross-section (circular, oval, pear shaped, etc), casing thickness; casing density; borehole fluid density; and borehole fluid thickness (or casing size).

In the case of an open-hole borehole, less variables are relevant and, lacking casing parameters, an otherwise casing-configured instrument or tool will function with extra dimensions to measure formation density, mudcake thickness, mudcake density, borehole fluid density and borehole fluid thickness.

With the large number of variables in mind, the prior art has attempted to make rigorous measurements of formation density by characterizing detector count rate for formation density for a given set of fixed borehole parameters. However, as set forth above, this is not realistic, because it is known that, at a minimum, cement thickness and geometry are not constant for all depths logged in normal wells.

Applicants have determined that one could improve the measurements of a logging tool using omni-directional radiation source and non-collimated radiation detectors. Applicant's logging tool is centralized and is able to measure the bulk density of an earth formation through steel casing or in an open-hole. The measurements can be determined by providing as many means for determining measurements as there are variables. For eight parameters, one solves eight equations. Accordingly, Applicant employs multiple detectors for specific borehole radial depth investigations and various calibrations means for establishing the measurements. Further, one could characterize certain instrument responses for a given subset of known borehole parameters. An example is using well log data to identify and set the casing size to in-place 4.5 inch casing, or other conventional sizes.

To overcome the deficiencies of prior art collimated and non-collimated measurements, embodiments can be employed using non-collimated radiation source and non-collimated spectral gamma-ray detectors to measure and calculate at parameters including; the apparent formation bulk density; casing thickness; cement thickness or mud thickness; cement density or mud density; wellbore fluid density (photoelectric absorption); and hole rugosity.

Herein, formation bulk density is directly determined, without the prior art needs for correction. Detectors are provided for characterizing casing wall thickness, cement thickness and density and formation density. Further, modelling techniques, such as Monte Carlo N-Particle (MCNP) model developed by the Los Alamos National Laboratory (Los Alamos, N.Mex., USA) have proved that calibration can be done for a tool so as to enable accommodation of variable conditions, give some basic parameters such as casing diameter. The MCNP permits calibration and response to be provided for a large range of scenarios, including a range of possible formation densities, cement thickness and densities and casing wall thicknesses.

Accordingly, given the number detectors, and knowing casing diameter, there are sufficient equations to solve for the number of variables in play including wellbore conditions such as bulk formation density, cement thickness, cement density and casing thickness. Surprisingly, an ultra-short-spaced detector, used for determining casing wall thickness, was relatively unaffected by variability in cement thickness and density for reliable determination of casing wall thickness.

Further, Applicant was also pleased to note that borehole rugosity can be managed, for the successful determination of formation density. By establishing an equivalent circular cross-section for a generally elliptical or other obround borehole, the equivalent borehole having a corresponding calibration and responses associated therewith.

Numerical methodology and models can implement calibration data for logging tool response to known bulk density values over a range of interest relative to the oil and gas industry, or other boreholes, be they cased or open-hole. The calibration data models the effects of steel casing and variable cement densities and cement thicknesses. As a result, bulk densities are determined without the need for corrections such as the prior "spine and ribs" corrections.

For example use of four detectors enables a numerical solution for four variables by using different source/detector radial depths of investigation to resolve for casing thickness, cement or annulus thickness, cement or annulus density, and formation density.

In an embodiment, a first ultra-short-space is to be axially positioned from the source a pre-set distance to measure only the casing signal. A second short-space detector is axially positioned from the source, and from the first detector, a pre-set distance optimized to measure the cement response—including cement density. A third or mid-space detector is axially positioned from the source, and from the first and second detectors, a pre-set distance to measure the cement response including cement thickness. A fourth far or long-space detector is axially positioned from the source, and from the first, second and third detectors, so as to measure responses related to the apparent formation bulk density.

The measurement of each variable could then be determined through the combinations of the count-rates between the four detectors and appropriate compensation algorithms determined to correct for an apparent formation bulk density.

Source-to-detector spacing can be to account for projected annular depth of investigation of interest. In other word, for a cased and cemented well, the source-to-detector spacing of the third and fourth detectors would accommodate allow for the annular cement sheath thickness, cement density and the casing.

In one aspect, a method of measuring formation density through-casing is provided including utilizing the differences between the scattered gamma-rays observed by the short-space, mid-space and long-space detectors to measure the annular fill material densities and material thicknesses interposed between the instrument or tool section and the formation. Another aspect of the invention is to measure the backscattered gamma-rays observed by an ultra-short-space detector to provide a measure of the casing wall thickness and casing internal diameter.

In another aspect, an improved gamma-ray emission and scattered gamma-ray measurement system functions to increase the gamma-ray count-rates observed at the gamma-ray detectors while reducing the source gamma-ray radiation intensity. An additional aspect of the increase in gamma-ray count-rates allows for the acquisition of spectral data from the count-rates observed by the short-space, mid-space and long-space detectors thus allowing spectral de-convolution of the observed count-rates. An additional aspect is an increase in the radial depth of investigation of the near wellbore and formation region relative to prior-art methodologies thereby increasing the investigative wellbore region volume.

A further aspect is an improved method to measure formation bulk density by utilizing the scattered gamma-ray count-rates observed by the short-space, mid-space and long-space detectors to calculate multiple independent count-rate ratio measurements.

A further aspect an improved method to measure formation bulk density by utilizing the scattered gamma-ray count-rates observed by the short-space, mid-space and long-space detectors to calculate three independent total count-rate formation density measurements.

Additional aspects include an improved method to determine the apparent formation bulk density measurement through using the scattered gamma-rays observed by the ultra-short-space, short-space, mid-space and long-space detectors to measure and calculate the materials transposed between the instrument section and the borehole formation including; the casing thickness, the casing density, the annulus material thickness transposed between the casing and formation, the annulus material density interposed between the casing and formation, the average borehole size, and the internal casing diameter.

A further aspect is a gamma-ray source emission geometry that is shielded only on the z-axis near the gamma-ray source and which comprises no azimuthal shielding. Still further aspects includes the elimination of any requirement to maintain direct contact with the casing wall or borehole wall by eccentralizing the logging instrument. Applicants have determined that centralizing the logging instrument, and with the measurement and determining methodologies disclosed herein, measurement sensitivity and accuracy is increased and further does not require high-compression mechanical-arms or pneumatic devices to maintain borehole contact. Still another aspect of the invention is an increase in log repeatability accuracy as the logging instrument is not affected by the tool azimuth or, rotation.

Additionally, the Applicants have also learned that the method is conducive to measuring formation density measurements through concentric strings of casing and multiple annuli.

While in one embodiment, a logging tool is well-placed for cased-hole applications, Applicants have discovered that the tool is also quite adaptable to measuring accurate formation density in open-hole wells without directly contacting the borehole wall and with minimal influence from the mudcake thickness, mudcake density or hole rugosity effects, thereby providing an improved formation density response with minimal environmental corrections.

Accordingly in one broad aspect, a method for downhole logging for obtaining information indicative of the bulk formation density of a subterranean earth formation penetrated by a borehole comprises irradiating the formation with a non-collimated emission of gamma ray radiation produced by a gamma ray source generally centralized in the borehole. Then one detects non-collimated scattered gamma rays at a first detector spaced from the source a first pre-set distance optimized to receive the scattered gamma rays from about the periphery of the borehole adjacent the source for establishing a first detector response; at a second detector spaced from the source a second pre-set distance optimized to receive scattered gamma rays from outside the periphery of the borehole for establishing a second detector response; and at least a third detector spaced from the source a third pre-set distance optimized to receive scattered gamma rays from the formation outside the periphery of the borehole for establishing a third detector response. Measures of the formation density are established by solving the response of the first, second and third detectors.

A logging tool for downhole formation density logging tool comprises: a non-collimated gamma ray source operative to irradiate a subterranean formation with a non-collimated emission of gamma ray radiation. A plurality of detectors are provided for at least establishing measures of the cement sheath thickness, cement density and formation density, the plurality of detectors comprising, a first non-collimated gamma ray detector spaced a first pre-set distance axially from the source and shielded therefrom, the first detector operative to measure at least the count-rates of non-collimated scattered gamma rays from a near wellbore area; a second non-collimated gamma ray detector spaced a second pre-set distance axially from the source and shielded therefrom, the second detector operative to measure at least the count-rates of non-collimated scattered gamma rays adjacent the near wellbore area; and at least a third non-collimated gamma ray detector spaced a third pre-set distance axially from the source and shielded therefrom, the third detector operative to measure at least the count-rates of non-collimated scattered gamma rays from the formation outside the near wellbore area.

In embodiments a fourth detector is provided, the first detector being an ultra-short-space detector, the second detector being a short-space detector, the third detector being a mid-space detector and the forth detector being a long-space detector. Using a calibration and configuration methodology for the detectors, relationships for the detector responses are determined as functions of three unknowns being cement thickness, cement density, and formation density. Knowing casing diameter, casing thickness (directly from the first detector response) and fluid density (from an energy ratio from any one of the detectors), the three unknowns can be solved using the second through fourth detector responses.

In an embodiment, any one or all of the detectors can be an array of detectors for circumferential discrimination of borehole parameters.

DETAILED DESCRIPTION OF THE DRAWINGS

Figure 1:
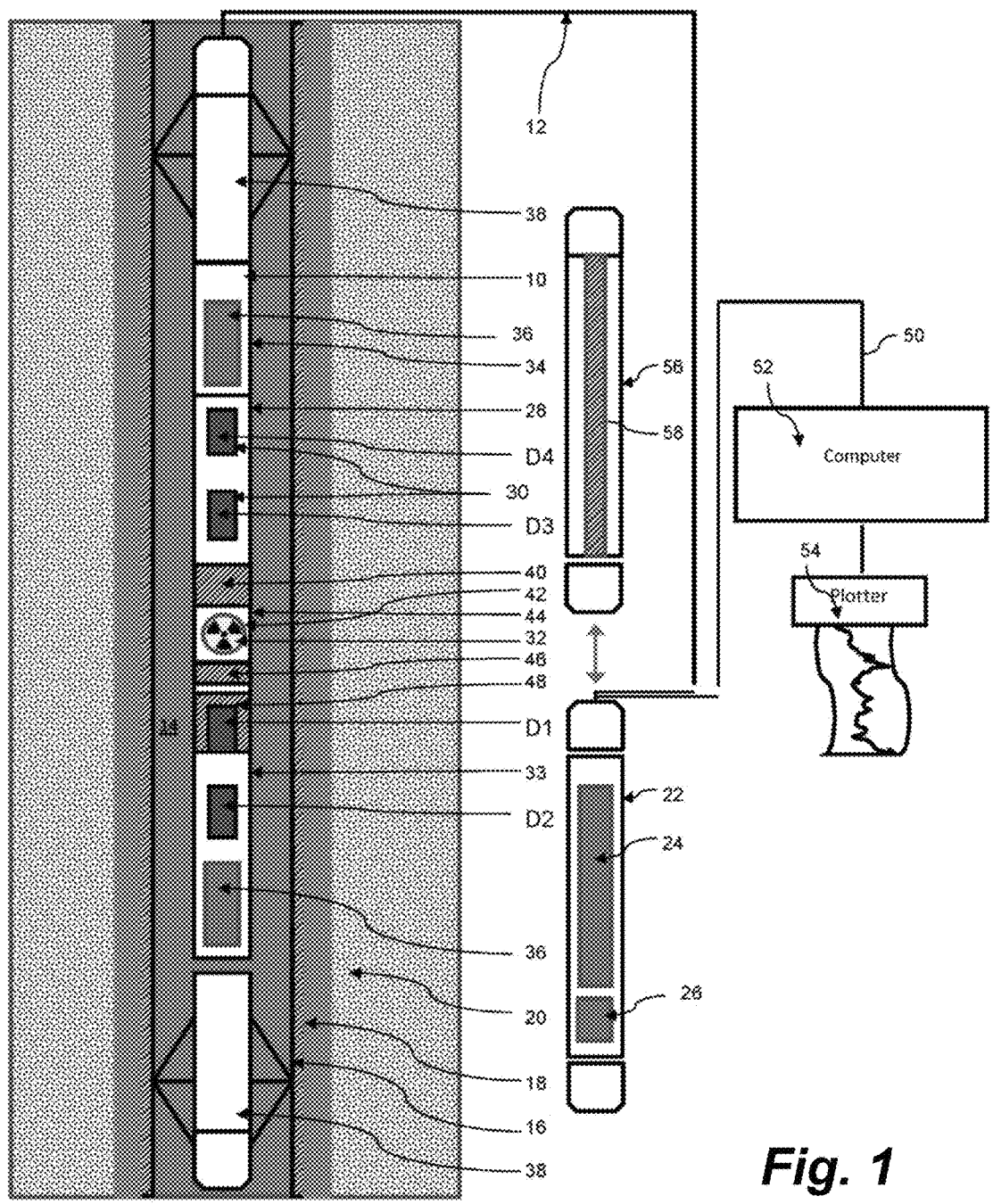
FIG. 1 is a schematic cross-sectional view of one embodiment of a logging apparatus in a cased borehole having an optional battery and telemetry sonde coupled therewith, the tools in communication with a surface computer and plotter.

In FIG. 1 a logging sonde 10 is depicted that is suspended by an armored electro-mechanical logging cable 12 in a borehole 14. The borehole 14 may be lined with a steel casing 16 that is cemented in place by a layer of cement 18 or other annular fill material that may also serve to mitigate fluid communication between adjacent producing formations 20. Alternatively, the steel casing 16 may also be in the form of a slotted or screened liner and the annular fill material may consist of gravel or sand or other mixture to prevent sand or fines production into the casing conduit and is well known to those skilled in the art. As a further alternative, the borehole 14 may be an open-hole or may be an open-hole barefoot completion that is located below a bottom of a casing string. Still further, a section of steel casing 16 may be configured with external casing packers that serve to isolate pre-determined intervals from inter-wellbore communication. Suffice it to say, it is within the scope of the invention that the borehole environment may be of multiple and varied configurations without detracting from the scope of the invention.

The logging sonde 10 may be run in conjunction with numerous other devices as necessary. The electro-mechanical logging cable 12 may consist of either a mono-conductor or multi-conductor configuration that contains insulated conductors which connect to a telemetry sonde 22 which is connected to the components within the logging sonde 10. The telemetry sonde 22 houses data acquisition control electronics 24 which includes an on-board memory 26 to record data from all of the devices ran in conjunction with the logging sonde 10.

In FIG. 1, a four-detector formation density tool 10 is provided. The tool features a pressure housing 28, which houses a gamma-ray source 32 and gamma-ray scintillators or detectors D1, D2, D3, D4, may be composed of Titanium or other low-Z material. Titanium (Ti) being a low-Z material has a low density, yet retains the mechanical strength required for a well logging instrument that must operate under harsh conditions. The low density of the Ti makes it well suited for gamma-ray transmission (less attenuation) as it does not absorb as many gamma-rays as other high-density materials.

To maximize the gamma-ray count-rates from a mid-space detector D3 and a long-space detector D4, a Ti sleeve 30 is placed around these detectors D3,D4 and both detectors D3,D4 are non-collimated thus they are able to record radiation incident from all sides. The axial placement of the detectors D3 and D4 from the gamma-ray source 32 has been optimized to pre-set or prescribed distances from the gamma-ray source 32. Above the Ti pressure housing 28 is an upper, stainless-steel pressure housing 34 that contains acquisition and processing electronics 36 for the gamma-ray scintillators D3 and D4. In accordance with the current invention detectors D3 and D4 are coupled to Multichannel Analyzers known to those skilled in the art and contained within the stainless-steel housing 34. Positioned above the upper stainless-steel pressure housing 34 is a centralizer 38 to maintain centralization of the density tool 10 inside the borehole. A four-arm centralizer 38 is suitable. Additional logging tools may be ran above the four-arm centralizer 38 as appropriate for the logging run.

Immediately below the mid-space gamma-ray detector D3 is a tungsten sleeve 40 to shield the mid-space D3 and the long-space D4 gamma-ray detectors from radiation streaming from the gamma-ray source 32.

The radioactive source 32 can be a $^{137}Cs$ but provided at a reduced activity of about 30 mCi as opposed to 1.5-2.0 Ci, as used in the collimated systems. Even though a lower activity radiation source is used, the effect of non-collimation increases the gamma-ray radiation count-rates over that of the prior art. In another embodiment, a greater penetrating gamma-ray source 32 can comprise a 50 mCi cobalt ($^{60}Co$) source which produces 1.173 and 1.333 MeV gamma-rays. Suitable detectors are thallium activated sodium iodide (NaI(Tl)) scintillators, measuring both energy received and counts per unit of time.

The gamma-ray source 32 is disposed within a source cavity 42 that is open to all sides allowing radiation to emit in a 360° or non-collimated manner. The gamma-ray source 32 is configured to allow electrical continuity and insulation between upper and lower tool sections which are adjoined at both ends of the source cavity 42. A titanium sleeve 44 covers the source cavity 42 and maximizes the gamma-ray output from the gamma-ray source 32. A tungsten shield 46 secures the gamma-ray source 32 in the source cavity 42 and also shields the lower tool section gamma-ray detectors D1 and D2 from direct gamma-ray radiation from the source 32.

A lower tool housing 33 may be composed of stainless steel or titanium or other low-Z material, if preferred. The ultra-short-space gamma-ray scintillation detector D1 is non-collimated and is encased in a stainless steel sleeve 48 to increase the intensity of gamma-ray attenuation occurring at the detector D1. Alternative materials, such as aluminum, may also be used to attenuate the gamma-ray radiation. Spaced axially below the ultra-short-space detector D1 at a prescribed distance is a non-collimated short-space detector D2. Both gamma-ray detectors D1 and D2 are positioned at prescribed distances from the gamma-ray source 32 to maximize the measurement of the scattered gamma-rays. The short-space gamma-ray detector D2 is coupled electronically to a Multichannel Analyzer, known to those skilled in the art. The D1 detector is coupled electronically to a four-channel digital counting board to measure scattered gamma-rays at pre-determined energies. Alternatively, ultra-short-space gamma-ray detector D1 may be coupled electronically to a Multichannel Analyzer.

Gross count rates and energy are determined at each of the four detectors. In an embodiment, and as stated above, D1 is the smallest spaced from the source 32 at about 7 inches with incrementally larger spacing from the source 32 being about 14 inches for D2, 16 inches for D3 and the longest spaced D4 at about 24 inches from the source 32. The pre-determined spacing from the source 32 can be modeled or empirically determined. Further, the detector volume is smallest to largest from D1 through D4 respectively. Due to the small diameter of the tool housing 28, detector volume is accommodated with each having a small diameter and an ever increasing detector length with the long-space detector D4 at about 6 inches in length. The shortest spacing and the longest spacing need not be above the source 32 and below the source 32 as shown, but can be in either orientation as long as the various spacing of the detectors as described, are provided.

Positioned below the lower tool housing 33 is a four-arm centralizer 38 to maintain centralization of the density tool 10 inside the borehole. Again, additional logging tools may be run below the four-arm centralizer 38.

In one configuration, the logging tool 10 may be operated as a surface readout (SRO) system using the telemetry sonde 22 to transmit data to surface using an electromechanical cable 50 that is interfaced to a surface computer 52 and which is interfaced to a plotter 54 to display the data. Alternatively, as shown in FIG. 1, the logging sonde 10 may be ran in a memory-mode using the telemetry sonde 22 and a battery sonde 56 that houses a battery 58 to power the logging sonde 10 and associated sensors and electronics. The memory-based system stores the data to the onboard memory 26 for retrieval at surface but may also be configured to transmit the data to surface through cables with conductors (SRO, Surface Read Out), or transmitted to surface via Mud-Pulse Telemetry or Electromagnetic Pulse Telemetry methods, such as those used in MWD (Measurement While Drilling) and LWD (Logging While Drilling) methods. A wireless data transmission scheme may be employed to transmit data to surface. Typically the various sondes would incorporate temperature-compensated gain stabilization methods as necessary for component therein.

As noted, the tool 10 does not need to be in direct contact with the casing 16 or formation 20 and can be manufactured having a very small profile or diameter. The non-collimated design ensures maximal count rates. For example, the tool 10 can have an OD as small as about 43 mm ($1^{11}/_{16}$ inches). There is some possible degradation with the need for small detectors and a greater dominance of attenuation factors. Centralizers 38 may not be required for small tools 10 in small tubing strings, or centralizers 38 having substantially full retraction capability are desirable. A $2^{3}/_{4}$ inch diameter tool 10 is suitable and optimal for most logging of cased wellbores 14 in the 4.5, 5.5 and 7 inch diameters. A small diameter tool 10 can be used as a low cost substitute during drilling to replace the conventional LWD tools.

In the smaller diameter tools 10, the small profile or diameter tool 10 permits entry and exit into cased wellbores 14 that may have restrictive wellheads installed and one or more tubing strings installed below the wellhead. The small tool 10 can run into existing tubing, avoiding the need to remove the tubing from the well to accommodate the deployment of the tool 10. The tool 10 can pass safely through conventional tubing bores having an internal diameter of 48.26 mm (1.90 In.) or greater and similarly through sub-surface flow control devices or other restrictions having an internal diameter of 43.89 mm (1.726 In.) or greater, passage through the tubing bottom to permit logging in casing, liners or open-hole, passage through standard weight drill pipe or heavy weight drill pipe with an internal diameter of 46.10 mm (1.815 In.) or greater and passage through drill string tool joints having an internal ID of 44.45 mm (1.750 In.) or greater.

Accordingly, the gamma-ray density tool 10 allows passage through open-ended drill pipe to enter and exit below the drill pipe bottom to log in open-hole or cased boreholes 14, including those with or without a wellhead, and that allows entry and exit in casing 16 that has been reduced in ID from its nominal ID as a result of collapse or mechanical intervention such as a casing patch or other casing repair means that may potentially reduce the nominal ID of the casing 16.

Figure 2:
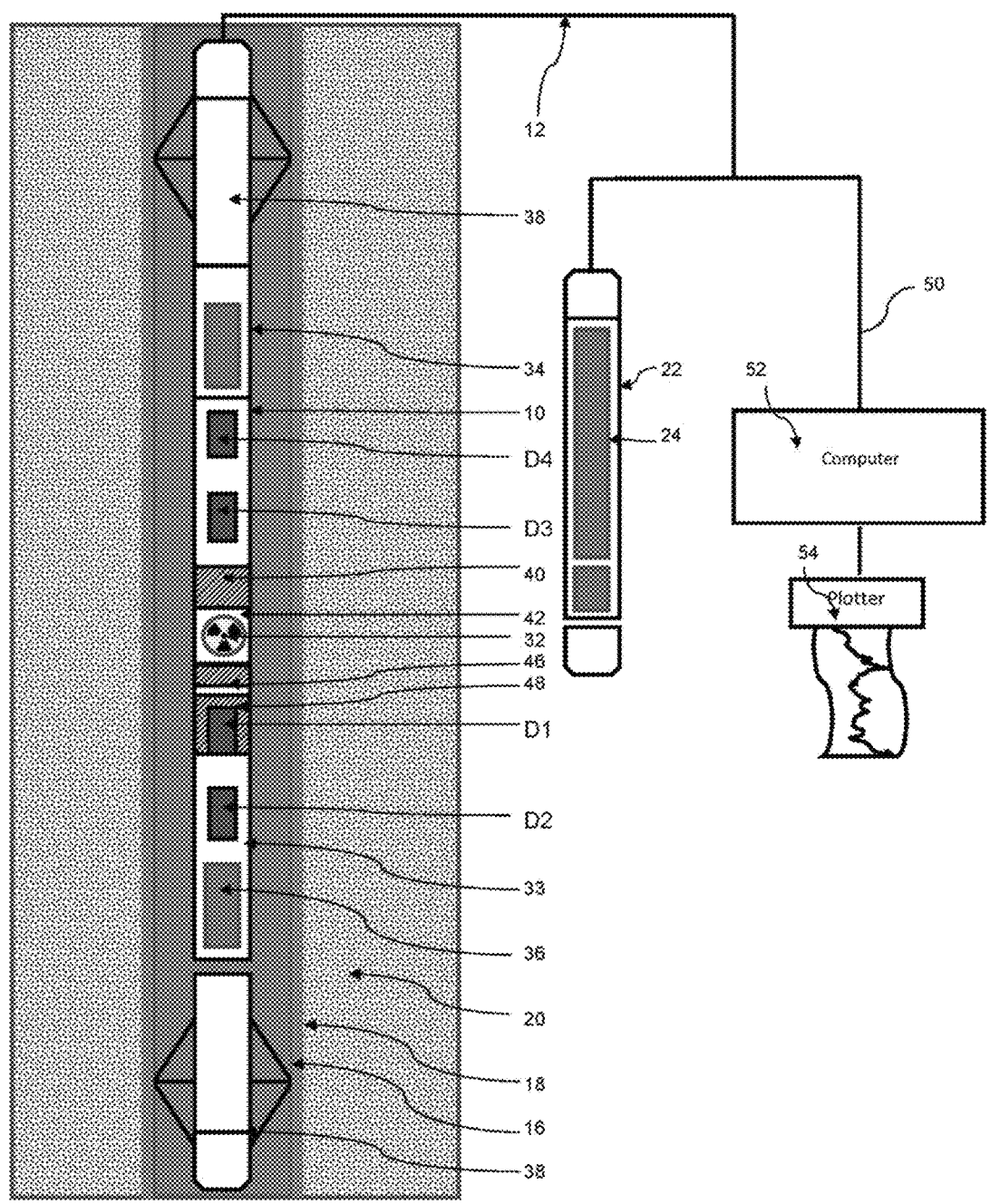
FIG. 2 is a schematic cross-sectional view of another embodiment of a logging apparatus in an open borehole.

FIG. 2 illustrates a logging tool 10 in an open-hole borehole 14. The illustrated embodiment is shown as a SRO system and is absent a battery sonde 56.

Figure 3:
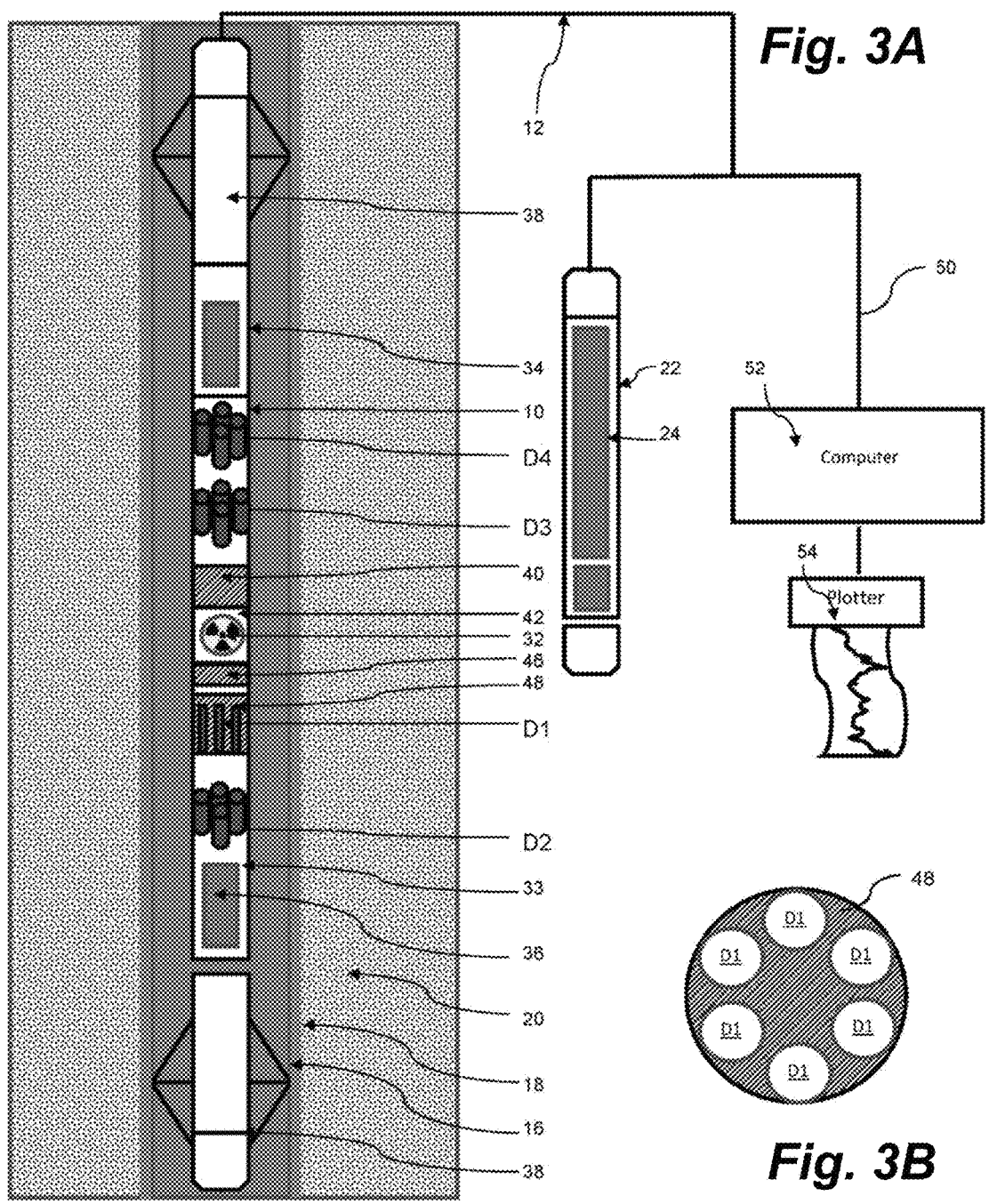
FIG. 3A is a schematic cross-sectional view of another embodiment of a logging apparatus having an array of like-detectors at for one or more spaced detectors locations.
FIG. 3B is an end view of one detector location illustrating an array of like-detectors according to FIG. 3A.

FIG. 3A is an illustration of a further embodiment that incorporates a plurality of detectors in an azimuthal array and which are shielded from one another to provide multiple, independent azimuthal measurements. The detector array data may be utilized to generate 2D or 3D data images of the borehole formation, annular material and wellbore region, including rugosity and fracture characterization. As shown, each of the arrays of gamma detectors comprises three or more gamma ray detectors, four shown in FIG. 3A, and six shown in FIG. 3B. The each of the detectors in the array positioned circumferentially about an axis of the tool 10. Each of the detectors within the array is shielded from other of the detectors in the array using a high Z material, such as tungsten. The shielding material is positioned relative to the detectors such that each of the detectors is substantially unshielded at the periphery of the array, shielded only by a low Z housing, so as to maximize count rates at each of the detectors from scattered gamma rays incident thereon. Thus, as parameters outside the borehole vary, the count rates at each of the detectors within the array, relative to the position of the detector to the portion of the borehole 14 adjacent thereto, will also vary. The count rates from each of the detectors can then be mathematically manipulated to obtain information regarding the variation of various parameters about a circumference of the borehole 14.

As one of skill in the art will appreciate, and as described for the four spaced detectors scenario above, each of the arrays of detectors within the tool 10 are shielded axially from the source using high Z material. In the embodiment shown, two detector arrays (D3 and D4) are positioned uphole of the source 32 and two detector arrays (D1,D2) are positioned downhole of the source 32. Sufficient high Z material 40,46 is positioned between the source 32 and the uphole arrays and between the source 32 and the downhole arrays to ensure any gamma emitted by the source 32 is substantially prevented from reaching the detector arrays. The shielding 40,46 may be disc shielding material or formed in a slightly convex orientation to influence an gamma transmission therethrough.

The tool 10 is oriented via an orientation sonde that provides XYZ (Inclination, Azimuth and Tool Face) measurements to orient the log responses from the individual detectors. A suitable orientation device is provided by Micro Tesla of Houston, Tex. The logging tool 10 can include a neutron array and an array spectral gamma tool for logging while drilling applications. An oriented sonde will provide orientation data for additional understanding of the borehole.

As indicated above, to assist with determining detector response, a general-purpose Monte Carlo N-Particle (MCNP) model was applied. MCNP is model code developed by the Los Alamos National Laboratory (Los Alamos, N.Mex., USA) that can be used for simulating nuclear processes including neutron, photon, electron, or coupled neutron/photon/electron transport.

The MCNP modelling and test data assist in calibrating the various detector responses for variables including casing thickness, casing diameter, casing thickness, cement thickness, Cement Density, Formation density, and borehole fluid density.

As illustrated below, one approach to solve for many and varied parameters includes a form of iterative multivariate analysis. Herein, Applicant has determined that several factors can be determined directly to lessen the number of unknowns, For example Applicant has determined that casing thickness can be directly determined from the count rate from ultra-short-space detector D1. Further, fluid density can be determined using a ratio of spectral energy ranges.

Therefore, one solves for the various parameters. For example detector D1 permits determination of casing thickness. The response for Detector D2 is a function of casing diameter, casing thickness, cement thickness, cement density, and formation density. Assuming casing diameter from site logs, and directly determining casing thickness, there remain at least three unknowns. Similarly, the response for Detector D3 is also a function of casing diameter, casing thickness, cement thickness, cement density, and formation density. Assuming casing diameter from site logs, and directly determining casing thickness, there remain at least three unknowns. The response for Detector D4 is also a function of casing diameter, casing thickness, cement thickness, cement density, and formation density. Assuming casing diameter from site logs, and directly determining casing thickness, there remain at least three unknowns.

The detector responses, from test data, MCNP, or both provide relationships between the unknowns including look-up tables, polynomials, exponentials or interpolative relationships. Regardless of the numerical technique, the responses for the three detectors provide three equations for the solution of the three unknowns.

As stated, presumable the casing diameter is known, and at least casing thickness can be directly determined with little error and therefore one can solve three equations for the remaining three unknowns. If one were to include borehole fluid density as an additional sixth variable, Applicant has determined that a good direct determination of fluid density can be made from anyone of the one of the detectors through a ration of the low energy and high energy spectra. Thus, or six dominant variables, a solution can be obtained.

So as to establish the relationships for the parameters, where the number of physical tests is unwieldy, MCNP runs were made with the following borehole parameters: casing OD being 4.5 in, casing wall thickness being 0.300 in, a limestone formation having density ranges from 1.5 to 2.65 g/cm$^3$, cement density being 1.9 g/cm$^3$ (mass density), and a range of borehole diameters ranging from 4.5 to 12 in. At 4.5 in boreholes, cement thickness is deemed to be 0 inch and, at 12 inch would have a maximum nominal thickness of about 3.75 on the radius. Further, casing thickness was varied between 0.2 to 0.45 inches.

Figure 4:
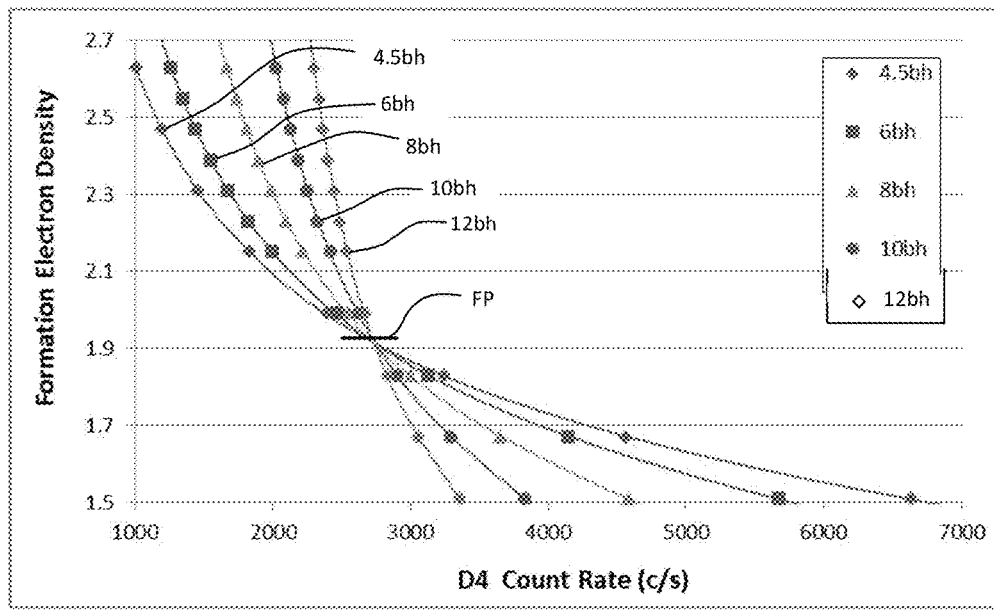
FIG. 4 is a graphical representation of the MCNP modeled non-linear relationship of count rate for the long-space detector and formation electron density for a range of cement thicknesses.

FIG. 4 is an illustration of MCNP calculations, predicted for long-space detector D4, taken for a series of borehole diameters versus formation electron density. The count rates for each of the symbol points were computed using MCNP modeling. The lines shown in the figure were least square fits to the individual data points for each borehole size. There are several features observed in the instrument response. These features include: all curves cross or converge to the same point where the electron density of the cement happens to be the same as the electron density of the formation. A horizontal black line, or focal point FP, has been plotted at this electron density; the response at 4.5 inch borehole is a boundary value curve at a deemed zero cement thickness; and there is clearly a non-linear response of count rate to density.

Further, the response is not a simple natural logarithm of count rate ln(cr) vs density due to the 360° omni-directional viewing by each detector. In the prior art a density logging tool with a collimated source and collimated detector results in a response that is nearly one-dimensional response, and thus having a conventional log of count rate to density.

Herein, the tool response is definitely not one-dimensional. Instead, at formation densities higher than the cement density, corrections to the density are positive, and at formation densities lower than the cement density, the corrections are negative. Other features are noted. The sensitivity of D4 to density reduces as the cement thickness increases, however, even at 12 in borehole there is still a formation density response. Mid-spacing detector 2 and long-spacing detector 3 both show the same trends. Ultra-short space detector D1 does not show the same diminishing sensitivity with cement thickness. Instead detector D1 responds primarily to the casing wall thickness, with an insignificant response to cement density.

Further, in FIG. 4, a lower cement density would have the same curve for the 4.5 inch borehole, but the focal point FP would move down on the 4.5 inch curve. The other curves would then fan out above and below from this new lower density focus.

Figure 5:
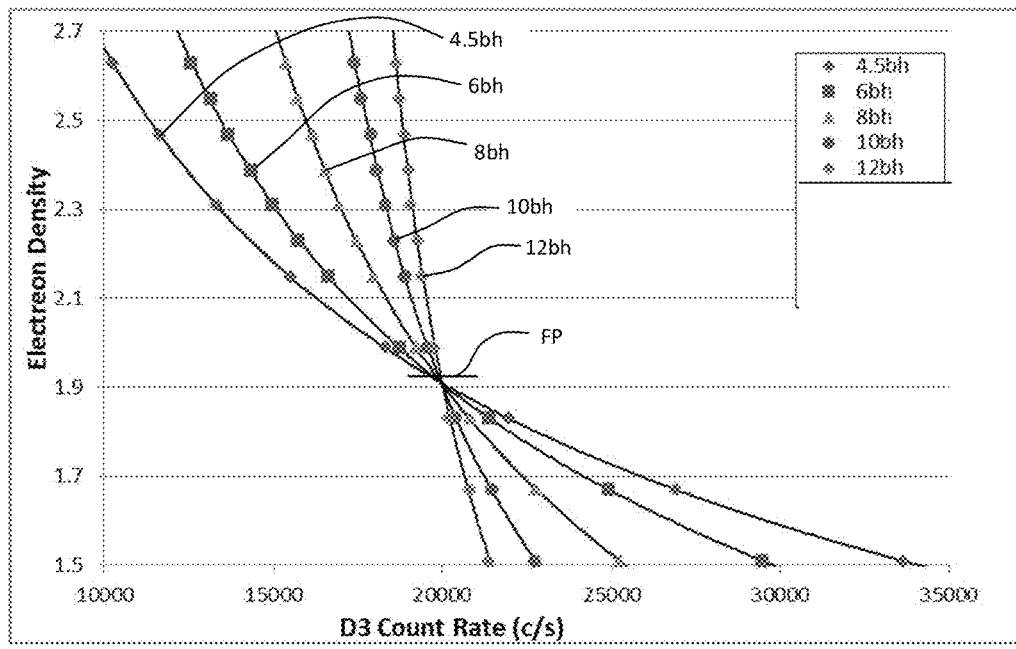
FIG. 5 is a graphical representation of the MCNP modeled non-linear relationship of count rate for the mid-space detector and formation electron density for a range of cement sheath thicknesses.

Turning to FIG. 5, MCNP calculations predicted for detector D3 are taken for a series of borehole diameters versus formation electron density. The count rates for each of the symbol points were computed using the MCNP modeling. Again, the lines shown in the figure were least square fits to the individual data points for each borehole size. Overall the sensitivity of D3 to formation density is somewhat less than for D4, but the count rates are much higher. Thus the statistical precision is better with D3 than with D4. This same trend is observed for the short-space detector D2. D1 does not exhibit any formation density response.

Illustrative of the use of multiple solutions for determining multiple unknowns, one recognizes that the responses of D3 and D4 are different, but they are both responses measuring the same formation density whatever that may be. Therefore, for example, knowing the casing diameters or cement sheath thicknesses are the same, one can use the two responses to calculate the formation density. Detector D2, similarly providing responses related to formation density, provide means for a cross check for formation density or can be applied for the solution of other parameters.

Figure 6:
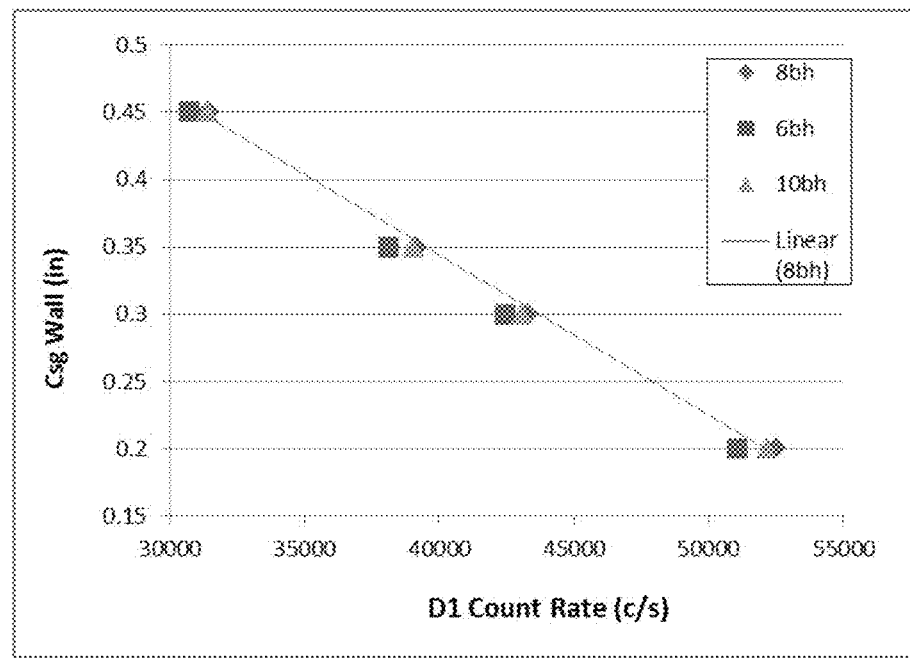
FIG. 6 is a graphical representation of a near linear relationship of count rate for the ultra-short-space detector and casing wall thickness for a range of cement sheath thicknesses.

In FIG. 6 an MCNP computed count-rate for D1 illustrates the insensitivity to borehole diameter or cement thickness. The model results were based on a 1700 kg/m3 cement density and 114.3 mm (4½) casing diameter. There is very little borehole size effect upon the response, any effect easily corrected. Also, there is only 1-2% change of D1 count rates with formation density. Further, Applicant determined that there is only, at most, an 11% change with cement density (not shown here). The D1 sensitivity makes it a very good measure of casing wall thickness.

Figure 7:
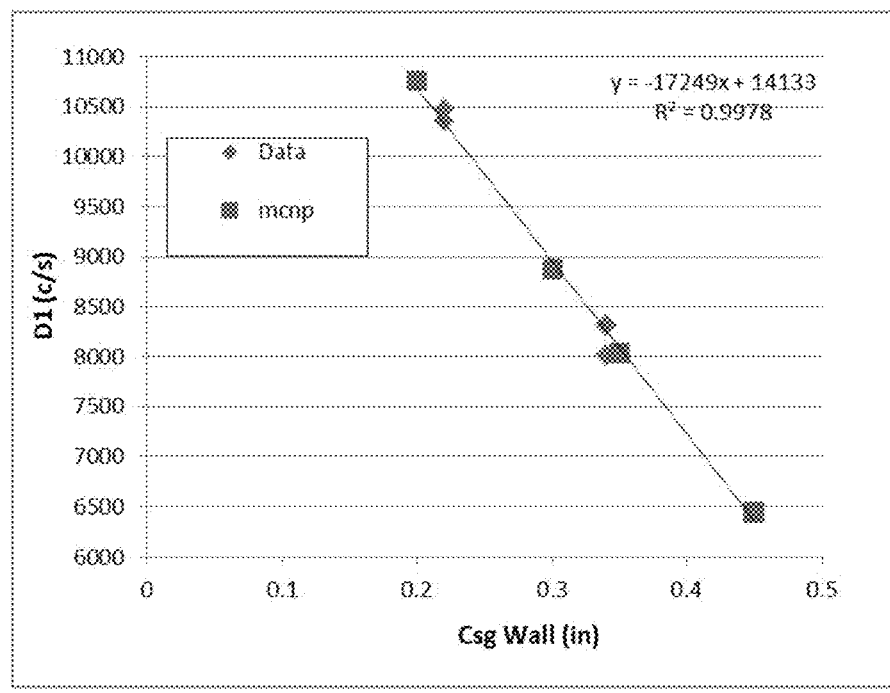
FIG. 7 is a graphical representation of the a near linear relationship of test data for two different formation densities and differing wall thicknesses compared to applied MCNP modeling.

In FIG. 7 a MCNP computed count-rate of D1 illustrates insensitivity to formation bulk density and the comparison of test model data. In this example, two test tanks with two different limestone densities were used to collect data with different cement thickness and casing wall thickness. After scaling by a constant factor, the following plot shows the comparison of MCNP computer modeling with data. Thus, in 4.5 in casing, D1 is very sensitive to wall thickness, and can be used to eliminate or confirm casing wall.

Figure 8:
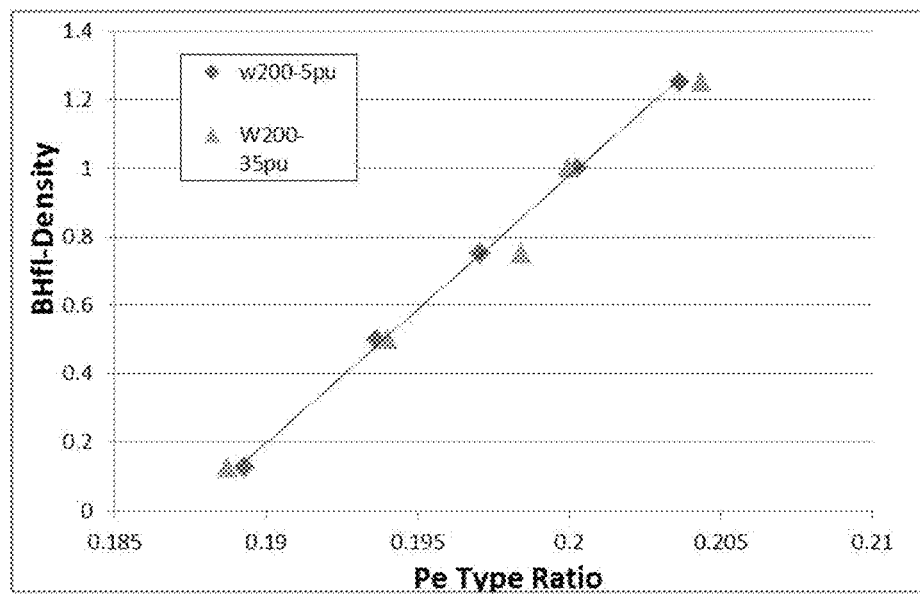
FIG. 8 is a graphical representation illustrating the use of borehole fluid density for correlation with formation density based upon the ratio of low and high energy windows as received at the mid-space detector.

FIG. 8 is an illustration of the MCNP computed spectral response to borehole fluid density and illustrates the insensitivity of the response to formation density. Some conventional density instruments make a formation density Pe measure by forming a ratio of a low energy window to a higher energy window.

Applicant's plot shows a formation density, Pe type ratios, for detector D3 in a 0.200 inch wall casing of 4.5 inches and a water filled borehole, but at different formation densities. The ratio are the counts of a low energy range divided by the counts at a higher energy range. In one embodiment, suitable ranges are a low energy of 50 to 110 keV over a higher energy of 111 to 250 keV. This ratio is not a relative Pe of the formation, but does respond to the borehole fluid density. Thus the borehole fluid density can be measured and used to correct the other responses for formation density. Detectors D2 and D4 have similar responses, thus providing multiple solutions, averaging or least square fitting to arrive at borehole fluid density.

Figure 9:
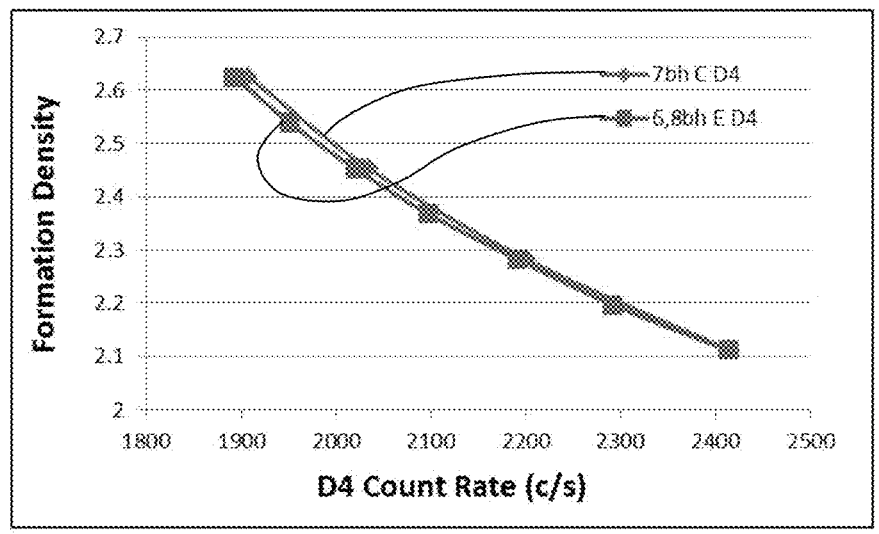
FIG. 9 is a graphical representation of the comparison of elliptical cement and its equivalence to a circular cement cross-section of like cross-sectional area.

FIG. 9 is an illustration of geometry effects and the concept of an equivalent borehole diameter or cement thickness measurement. Non-circular cement cross-section was addressed by computing modeling results for several elliptical cement configurations. The illustration compares the results for an elliptical cement with minor axis and major axis of 6 and 8 inch respectively, to a circular cement cross-section of 7 in OD (both outside of 4.5 inch casing). Thus the concept of an effective cement thickness is applicable. The average circular OD of 7 inch is very close to the same cross-sectional area of the ellipse with major and minor OD's of 8 and 6 inch. The effective circle OD (with 4.5 inch casing) to match a 6-8 ellipse (with 4.5 inch casing) is 6.93 inch OD. The same agreement exists for D3 and D4 concerning the concept of an effective thickness.

Cement thickness measurements can be obtained given other variables that have been derived. Consider the conditions shown in FIG. 4 of detector D4 count rate with formation density. The least square fit functions shown as lines in this figure use a formula with three coefficients. The first coefficient a0 is a simple function of cement thickness and is illustrated in FIG. 10.

Figure 10:
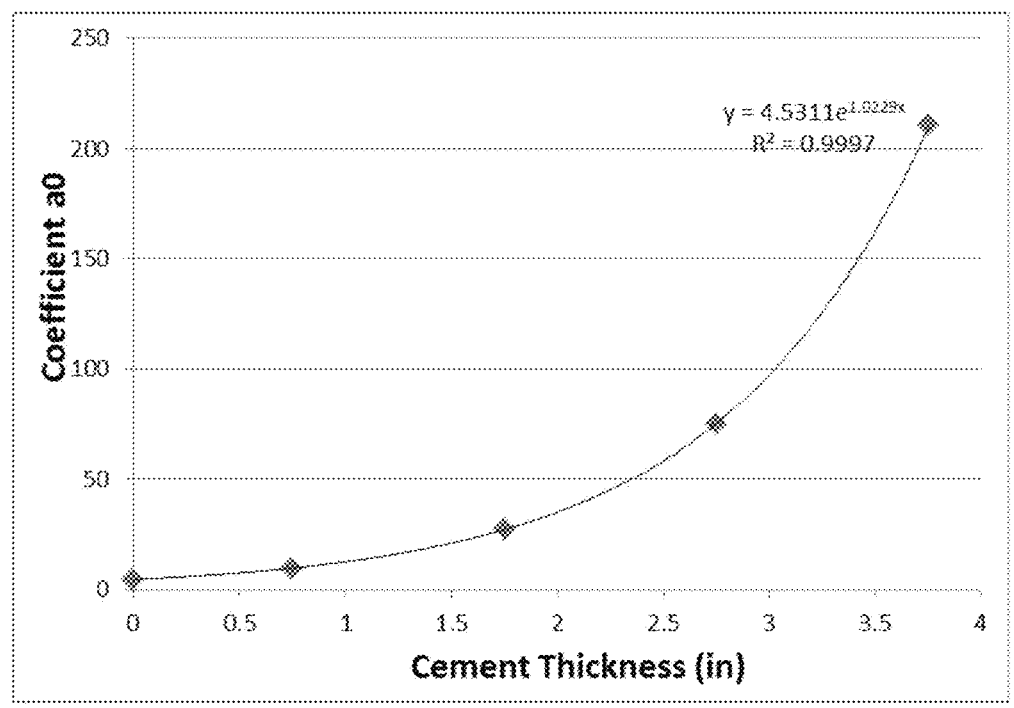
FIG. 10 is a graphical representation of cement thickness determined having obtained parameters from each of the long, mid and short-space detectors.

FIG. 10 is an illustration of the simple and unique function of one coefficient a0 of the three coefficients to calculate the cement thickness. The other two coefficients also show a systematic dependence upon cement thickness. The same trends exist for D3 and D2, but with different values and different parameters. Thus given all other parameters determined, then the simultaneous solution of D4 and D3 can be used to arrive at formation density and cement thickness. This process can be expanded to include D2 as either an over-determined solution or to solve for formation density, effective cement thickness, and cement density.

Figure 11:
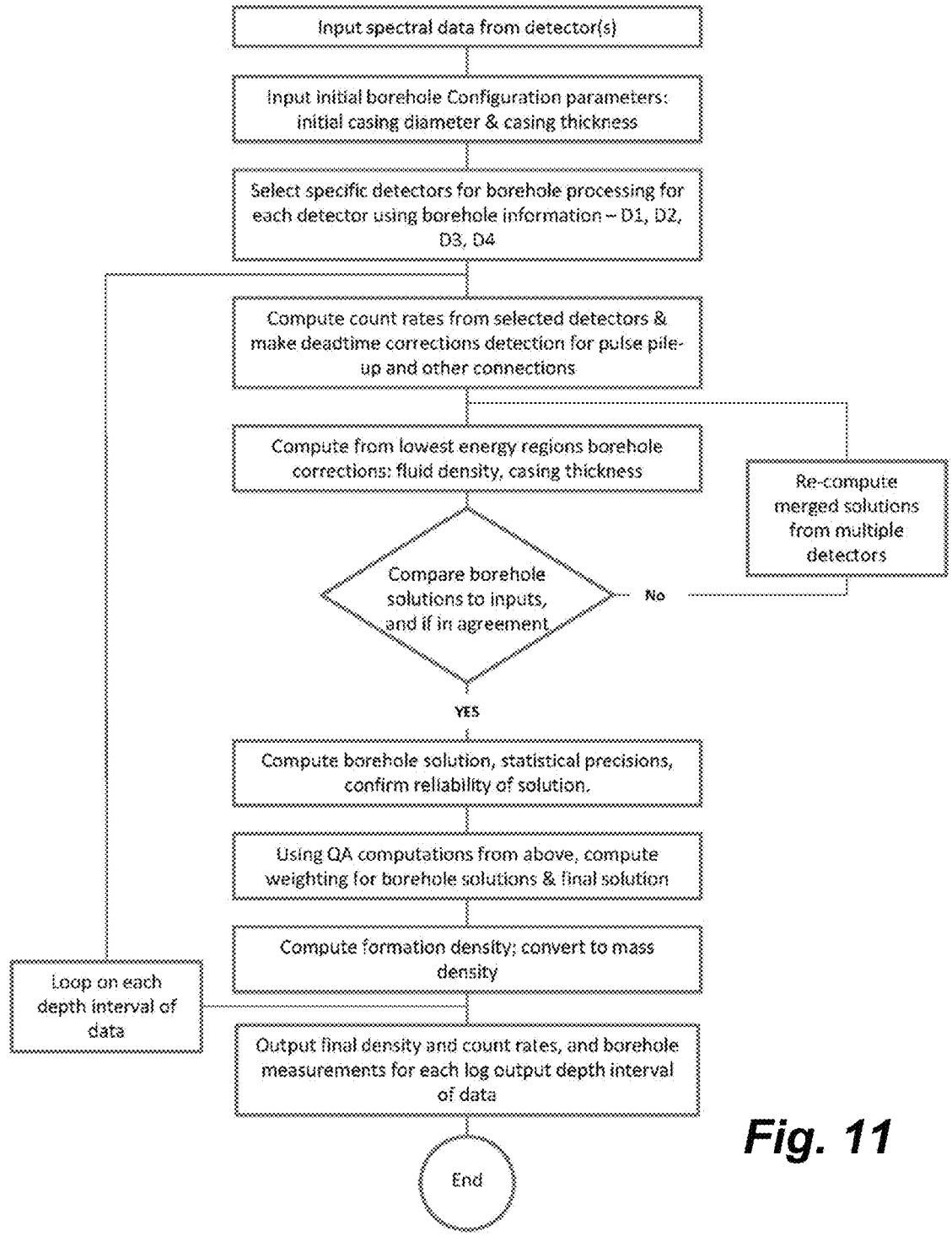
FIG. 11 is a flowchart representation of one embodiment of the operation of the logging tool for logging a borehole and analysis thereof.

FIG. 11 is an illustration of the analytical flowchart architecture to derive the apparent formation bulk density from the scattered gamma-ray measurements.

As part of the tool or post-processing activities, the tool is calibrated or configured to set the relationship of spectra data from each specific detector. Initial borehole configuration parameters are input and specific detectors are selected for borehole processing.

The tool is run in hole for logging the borehole and, at each depth increment down an interval of interest in the borehole, count rates and spectral energy for scatter gamma rays are received by each of the specific detectors. The source irradiates the formation with a non-collimated emission of gamma ray radiation produced by the gamma ray source generally centralized in the borehole. A response from non-collimated scattered gamma rays are detected at a first detector spaced from the source a first pre-set distance optimized to receive the scattered gamma rays from about the periphery of the borehole adjacent the source, or near wellbore area, for establishing a first detector response. This response would be at the borehole wall for an open-hole borehole, and at casing in the cased-hole borehole. A second detector spaced from the source a second pre-set distance optimized to receive and detect scattered gamma rays from outside the periphery of the borehole for establishing a second detector response. This would be in the cement portion of a cased-hole and in the formation of an open-hole. At least a third detector spaced from the source a third pre-set distance is optimized to receive and detect scattered gamma rays from the formation outside the periphery of the borehole for establishing a third detector response.

In tool, or in post-processing, deadtime corrections for pulse pileup, lost counts and other corrections are made. The detector responses are used to compute direct borehole parameters such as fluid density and casing thickness. Initial borehole configuration parameters can be adjusted based on detector responses. The adjusted parameters are compared to the initial parameters and if they are not in agreement the process is iterated. Once in agreement, the collected detector responses are solved for the remaining parameters. Measures of the formation density are established by solving the responses of the first, second and third detectors.

The solutions are examined to determine their reliability and final values for the parameters are established. Weighting factors can be applied and solutions determined including formation density. The density can be converted to a mass density then output for that depth increment.

The process repeats for the next depth increment.

Any part of the detailed solutions for parameters can be made in tool or in post processing at surface. In a memory tool, little processing is performed during logging. With a SRO, wired, wireless or tool otherwise in communication with surface while logging, raw data, processed data or a combination of data can be streamed to surface. Typically some rough calculations and data is provided real time as indicative of the health of the system or borehole integrity or quality.

The embodiments of the invention for which an exclusive property or privilege is claimed are defined as follows:

1. A method for downhole logging for obtaining information indicative of bulk formation density of a subterranean earth formation penetrated by a cased borehole, a casing forming a periphery of the borehole; the method comprising:
   irradiating the formation with a non-collimated emission of gamma ray radiation produced by a gamma ray source centralized in the borehole;
   detecting non-collimated scattered gamma rays at a first detector spaced from the source by a first pre-set distance optimized to receive the scattered gamma rays from the periphery of the borehole adjacent to the source for establishing a first detector response;
   establishing a relationship for casing thickness as a linear function of the first detector response for at least one casing diameter, determining the casing diameter, and determining the casing thickness from the linear function of the first detector response;
   a second detector spaced from the source by a second pre-set distance optimized to receive scattered gamma rays from outside the periphery of the borehole for establishing a second detector response;
   at least a third detector spaced from the source by a third pre-set distance optimized to receive scattered gamma rays from the formation outside the periphery of the borehole for establishing a third detector response;
   determining a low energy response and a higher energy response from one of the second or third detectors; and
   determining a fluid density of a fluid in the borehole from a ratio of the low energy response to the higher energy response for determining a cement sheath thickness, a cement density and the formation density from the first detector response, the second detector response and the third detector response.

2. The method of claim 1 further comprising:
   establishing a relationship for the formation density as a function of the second detector response and the third detector response for a known casing diameter and the casing thickness; and
   determining the cement sheath thickness, the cement density and the formation density from the second detector response and third detector response.

3. The method of claim 1 further comprising:
   detecting non-collimated scattered gamma rays at a fourth detector spaced from the source by a fourth pre-set distance optimized to receive the scattered gamma rays from outside the periphery of the borehole for establishing a fourth detector response; and
   establishing a relationship for the formation density as a function of the second detector response, the third detector response and the fourth detector response for a known casing diameter and the casing thickness; and
   determining the cement sheath thickness, the cement density and the formation density from the second detector response, the third detector response and the fourth detector response.

4. The method of claim 3 further comprising:
   establishing the relationships using a general-purpose Monte Carlo N-Particle model of the borehole.

5. The method of claim 4 further comprising:
   determining the cement sheath thickness, the cement density and the formation density from the second detector response, the third detector response, and the fourth detector response for a known casing diameter and the casing thickness.

* * * * *